United States Patent

[11] 3,573,343

| [72] | Inventors | Woodrow A. De Smidt;<br>Edward H. Kuhn, Milwaukee, Wis. |
|---|---|---|
| [21] | Appl. No. | 805,535 |
| [22] | Filed | Mar. 10, 1969 |
| [45] | Patented | Apr. 6, 1971 |
| [73] | Assignee | Allen-Bradley Company<br>Milwaukee, Wis. |

[54] ELECTRICAL APPARATUS FOR HAZARDOUS LOCATIONS
8 Claims, 11 Drawing Figs.

[52] U.S. Cl. ..................................................... 174/52,
174/50, 200/168, 317/120
[51] Int. Cl. ..................................................... H05k 5/00
[50] Field of Search ............................................ 174/50,
50.5, 52; 317/99, 119, 120; 200/50.1; 340/381;
220/55—0, 80

[56] References Cited
UNITED STATES PATENTS

| 2,796,559 | 6/1957 | Feucht | 317/99X |
| 3,016,431 | 1/1962 | Steigerwald | 200/50(.1) |
| 3,037,154 | 5/1962 | Arneberg | 317/120 |

*Primary Examiner*—Darrell L. Clay
*Attorneys*—Thomas O. Kloehn and Arthur H. Seidel

ABSTRACT: An electrical apparatus enclosure made up of a base adapted for mounting on a panel and a cover to be assembled on the base portion. The base and cover flanges about the open ends are clamped together by a clamping ring. A transverse mounting plate is bolted inside the base and longitudinal mounting plate projects from the center of the transverse mounting plate to support electrical apparatus inside the cover. Control handles are mounted on the outer end of the cover to move actuators inside the cover, which operate the enclosed apparatus. Conduit ports are formed in the base.

PATENTED APR 6 1971
3,573,343
SHEET 1 OF 5
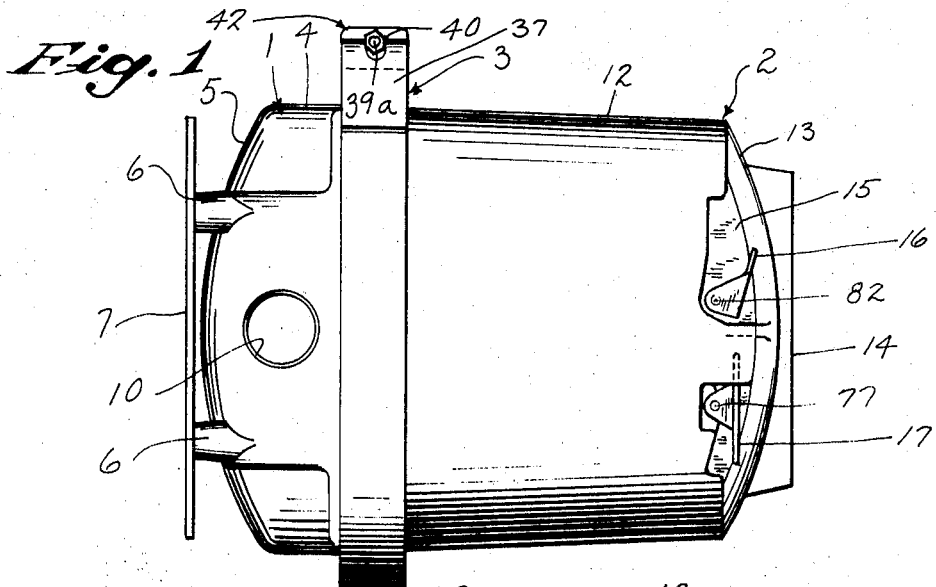
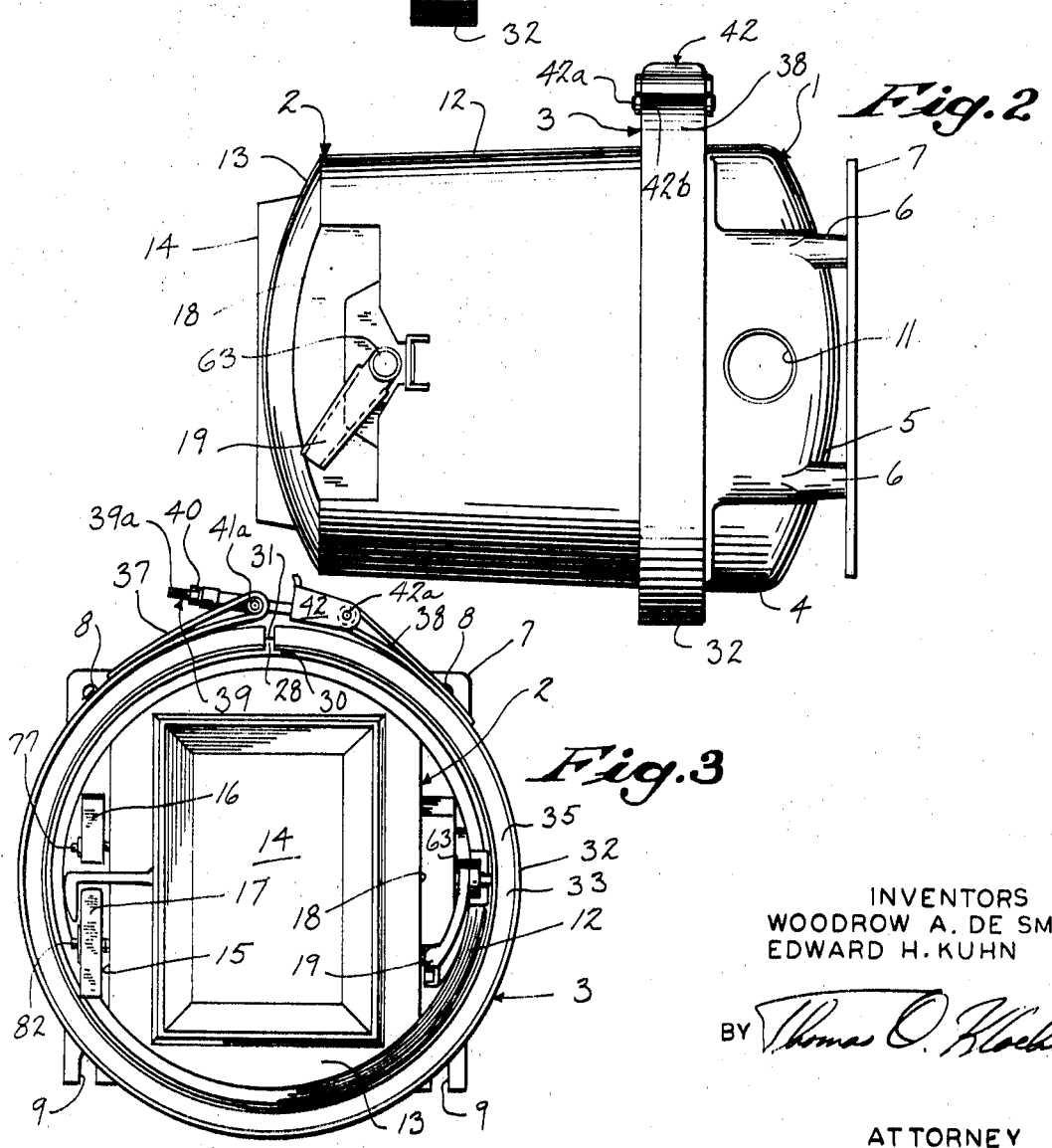
INVENTORS
WOODROW A. DE SMIDT
EDWARD H. KUHN
BY Thomas O. Kloehn
ATTORNEY

INVENTORS
WOODROW A. DE SMIDT
EDWARD H. KUHN

BY Thomas O. Kloehn

ATTORNEY

INVENTORS
WOODROW A. DE SMIDT
EDWARD H. KUHN

BY Thomas O. Kuhn

ATTORNEY

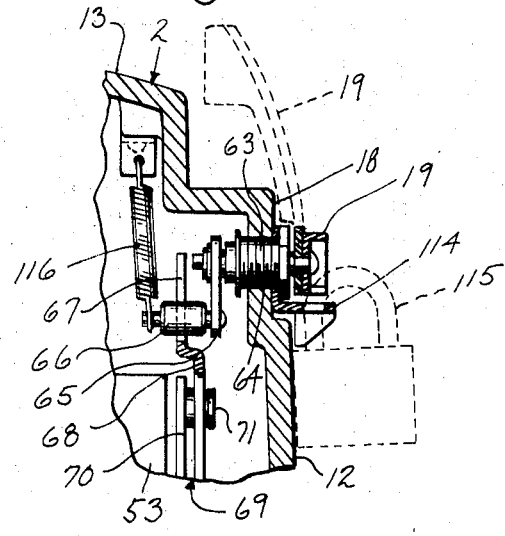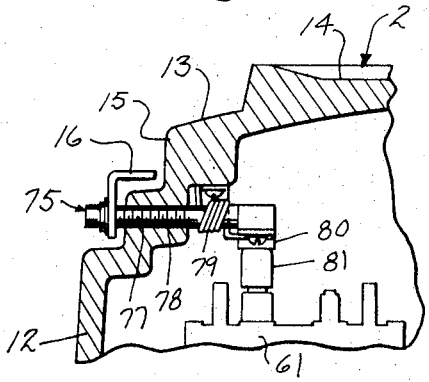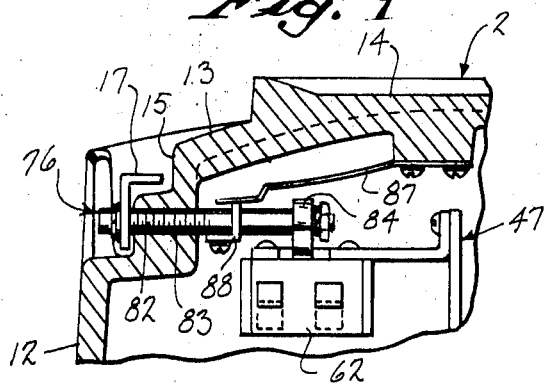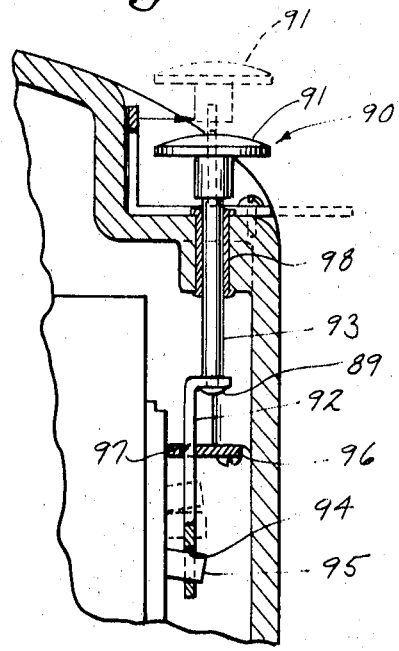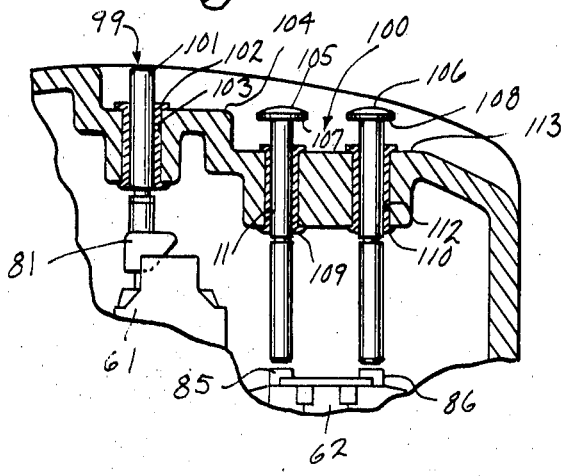

ELECTRICAL APPARATUS FOR HAZARDOUS LOCATIONS

BACKGROUND OF THE INVENTION

The enclosure of the present invention was created to satisfy the standards for National Electrical Manufacturers Association (Nema) types 7 and 9 enclosures for electrical apparatus. The type 7 enclosure is prescribed for use in locations where the atmosphere may contain explosive vapors and gases, and the type 9 enclosure is prescribed for use in atmosphere that may contain explosive dusts. What is needed is an enclosure adapted for panel mounting that satisfies the Nema standards, that minimizes panel space, that presents manual control in an easily accessible position, that can be easily and rapidly opened and closed for servicing and installation purposes, and that when open, will expose all of the electrical apparatus in readily accessible positions.

The prior art has developed a variety of enclosures in an attempt to satisfy the same need. U.S. Pat. Nos. 3,016,431; 3,037,154; and 3,059,231 disclose one type of enclosure that is intended to serve the same purposes as the present invention, but it occupies more panel space, is less readily opened and closed and does not present all of the enclosed apparatus in as accessible positions as the enclosure of the present invention. The enclosure shown in U.S. Pat. No. 2,814,701 is of a somewhat different configuration in that the panel-mounted base portion opens downwardly and the electrical apparatus suspends from the base, but this housing occupies an excessive amount of panel space and is bulky for the amount of equipment that it will enclose. U.S. Pat. No. 2,734,097 discloses a compact housing which has limited capacity and would be more difficult and time consuming to open and close than an enclosure embodying the present invention. Though the prior art contains many functional housings satisfying the mentioned Nema standards, there remains a great need for improvement.

SUMMARY OF THE INVENTION

The present invention relates to an enclosure for electrical apparatus to be located in hazardous locations and more specifically the invention resides in an enclosure having a hollow base which is adapted for mounting on a panel and which has a flange about its outward opening end with a sealing surface on it, and a hollow cover, which has a flange about its inward opening end adapted to form a seal with the flange on the outward opening end of the base portion, and a clamping ring which engages the flanges on both the cover and the base to force the sealing surfaces into sealing engagement with one another and to hold the cover on the base. The invention also resides in equipment-mounting means within said enclosure and in the combination of said enclosure with equipment-mounting means.

An enclosure embodying the foregoing combination occupies a minimum amount of space on the mounting panel so that a maximum amount of units can be mounted on a single panel and it is also compact in all of its dimensions. Such an enclosure may be opened and closed quickly and easily, and when it is open, the electrical apparatus is exposed for ready accessibility.

BRIEF DESCRIPTION OF THE DRAWINGS

In the drawings:

FIG. 1 is a side view in elevation of an enclosure embodying the present invention;

FIG. 2 is a side view in elevation of the enclosure embodying the present invention from the opposite side of that shown in FIG. 1;

FIG. 3 is an end view in elevation of the exterior of an enclosure embodying the present invention as seen from the outer end;

FIG. 7 is a partial view in section taken along the line 7—7 in FIG. 4;

FIG. 8 is a partial view in section taken along the line 8—8 in FIG. 4;

FIG. 9 is a partial view in section taken along the line 9—9 in FIG. 4;

FIG. 10 is a partial view in section illustrating an alternative type of manual control and actuator to that shown in FIG. 7; and FIG. 11 is a partial view in section of an enclosure embodying the present invention showing an alternative type of manual control to the manual control illustrated in FIGS. 8 and 9.

DESCRIPTION OF THE PREFERRED EMBODIMENT

Figure 4:
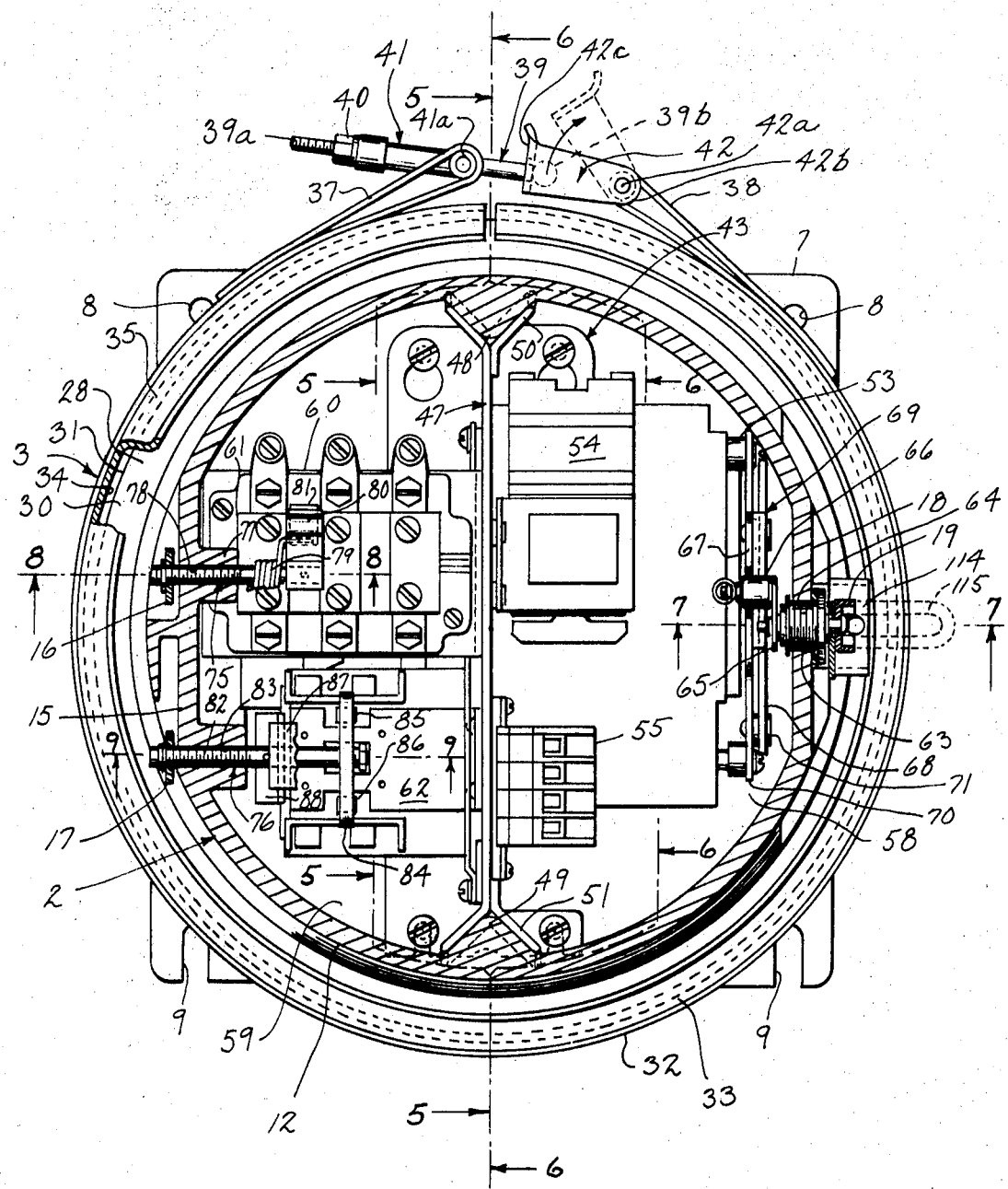
FIG. 4 is an end view of an enclosure embodying the present invention taken along the line 4—4 of FIG. 5.

The enclosure shown in external view in FIGS. 1—3 is made up of hollow base and cover portions 1 and 2, respectively, which are assembled and fastened together by a clamping band 3 to form a cylindrical enclosure. Both the base 1 and the cover 2 are one-piece cast aluminum members. The base portion 1 has a relatively narrow cylindrical lateral wall 4 and a dished base end 5 with supporting legs 6 projecting to a mounting plate 7 to give clearance for the crown of the dished end 5. The mounting plate 7 has mounting holes 8 in its upper corners and mounting slots 9 in its lower corners through which bolts or other fasteners can be inserted to mount the enclosure on a vertical panel (not shown). Conduit ports 10 and 11 on opposite sides of the base portion (FIGS. 1 and 2) which communicate through the lateral wall 4 to the interior of the base portion 1 to provide access for electrical conductors to the apparatus housed in the enclosure. The conduit ports 10 and 11 are internally threaded to receive either a conduit or a tapered plug neither of which are shown in the drawings.

The cover 2 has a long cylindrical lateral wall 12 and a dished cover end 13 which has a flat, framed mounting surface 14 for a name plate (not shown) on its crown. The front end of the cylindrical lateral wall 12 of the cover portion 2 has a flattened, recessed, chord surface 15 on one side for mounting an overload reset handle 16 and an on-off pushbutton handle 17 of reset and pushbutton operator assemblies, so that the handles 16 and 17 are substantially inside the profile of the cover 2 and recessed behind the crown of the dished front end 13. On the opposite side of the enclosure shown in FIG. 2, another flattened surface 18 is formed as a chord to the cylindrical portion of the lateral wall 12 parallel to the other flattened surface 15, at the front end of the cylindrical lateral wall 12 and a circuit breaker handle 19 is mounted on this flat surface 18, so that it is substantially within the radius of curvature of the cylindrical lateral wall 12 and beneath the crown of the dished cover end 13. Although the overload reset handle 16, the on-off pushbutton handle 17 and circuit breaker handle 19 are all recessed within the profile of the enclosure so as not to be accidentally actuated and so as not to interfere with the operation of or work on adjacent apparatus, they are nevertheless readily accessible and conveniently operated.

Figure 5:
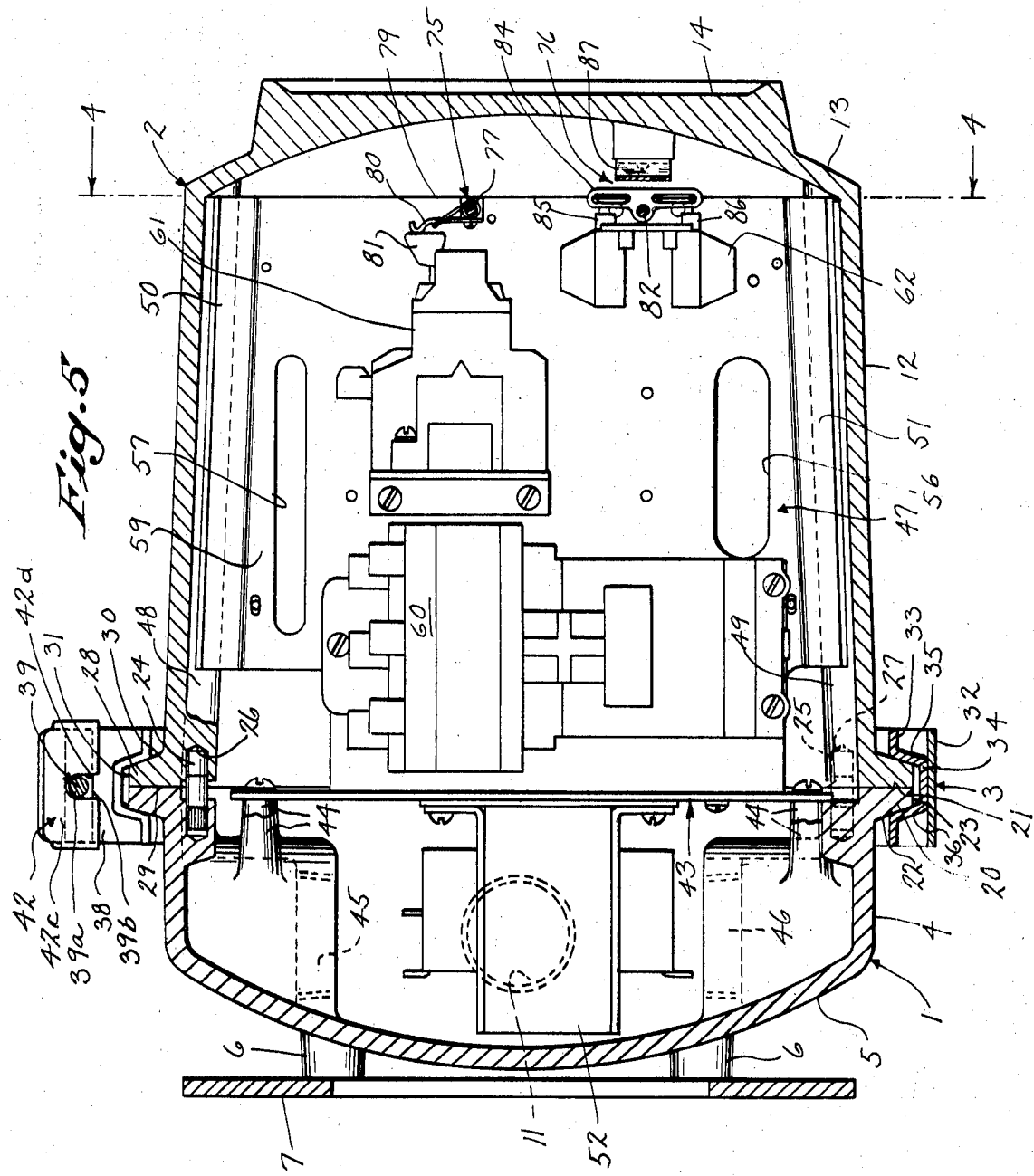
FIG. 5 is a side view in elevation of an enclosure embodying the present invention taken along the line 5—5 in FIG. 4.
Figure 6:
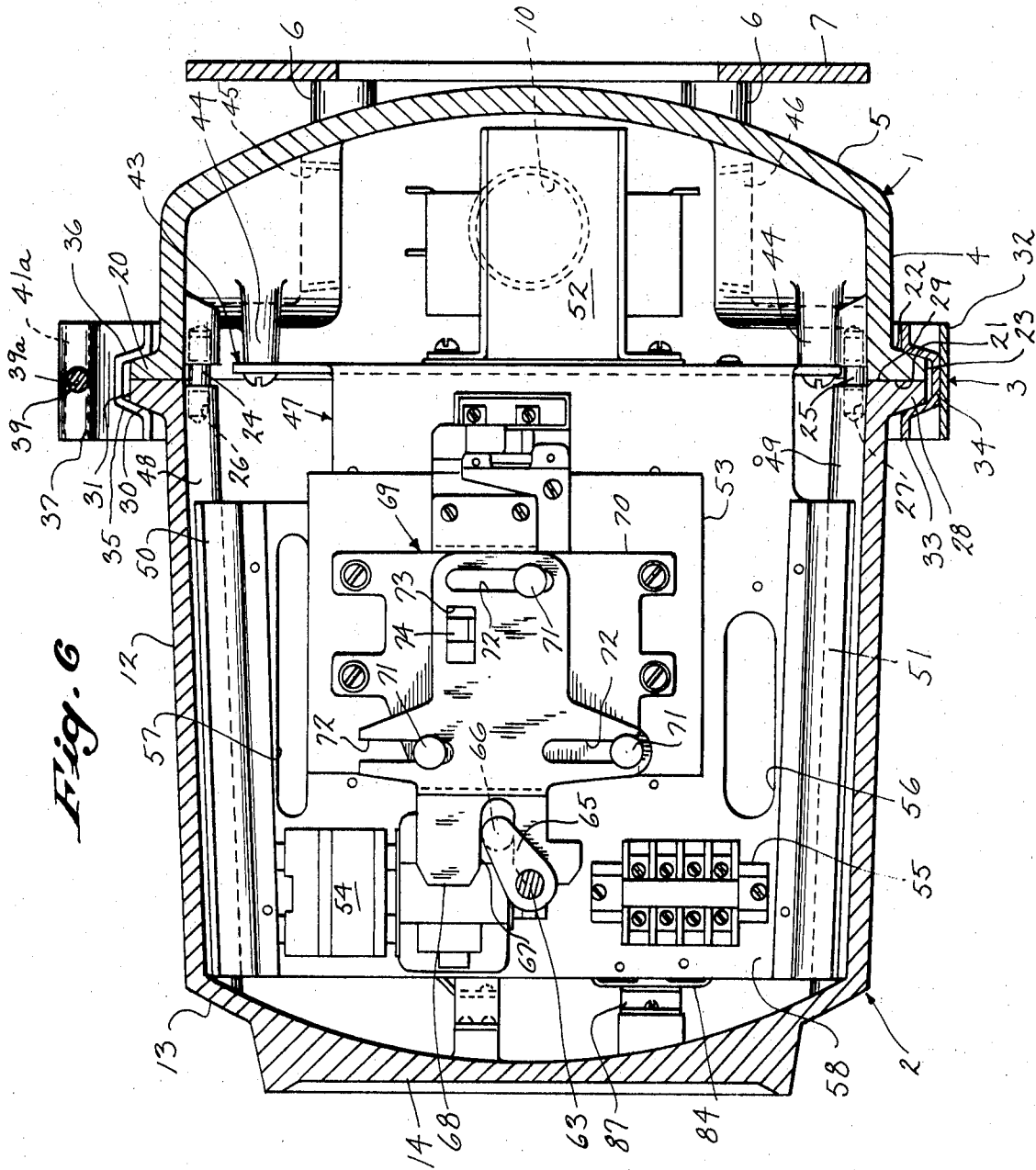
FIG. 6 is a side view partially in section of an enclosure embodying the present invention taken along the line 6—6 in FIG. 4.

FIGS. 5 and 6, showing the enclosure in section from opposite sides, reveal the apparatus inside to show other aspects of the structure of the enclosure itself that are not externally visible. The base which is completely closed at the back except for conduit ports such as the ports 10 and 11, opens to the front and an annular flange 20 fans radially outwardly about the end of the cylindrical lateral wall 4 and has a front facing, machined sealing surface 21. The back exterior surface 22 of the annular flange 20 slopes forwardly from the lateral wall 4 to an outer peripheral surface 23 of the flange 20. Two guide pins 24 and 25 are anchored in upper and lower portions of the front end of the cylindrical lateral wall 4 of the base 1 to project forwardly and seat in guide holes 26 and 27 in the top and bottom, respectively, of the lateral cylindrical wall 12 of the cover 2 when the cover 2 is in proper alignment for assembly on the base 1. The back end of the cylindrical lateral wall 12 of the cover 2 also has an annular flange 28 projecting radially from it with a rearward facing, machined sealing surface 29 shaped to mate with the forward facing machined sealing surface 21 on the base 1 so that the two surfaces 21 and 29 will form a tight seal when the cover 2 is assembled on the base 1 and comply with the Nema standards for types 7 and 9 enclosures. The annular flange 28 on the lateral cylindrical wall 12 of the cover portion 2 has a rearwardly sloping front surface 30 that slopes rearwardly to a peripheral surface 31.

The clamping band 3 is made up of a flat, annular tightening band 32 that is spot welded to the outside of a channel-shaped annular clamping ring 33. Viewing the clamping ring 33 in section, it can be seen it has a cylindrical floor portion 34 with diverging walls 35 and 36 projecting inwardly from its opposite sides. The diverging walls 35 and 36 serve as inclined planes bearing against the outside surfaces 22 and 30, respectively, of the flange 20 on the base 1 and the flange 28 on the cover 2. The tightening band 32 has loops 37 and 38, respectively, formed on its opposite ends as attachment means for attaching the tightening band 32 to an adjustable fastening means.

The adjustable fastening means includes a T-shaped connecting bolt 39 which has a threaded shank 39a to receive a nut 40 and a transverse rod 39b is fastened across an end of the shank 39a. A tubular sleeve 41 fits slidably about the shank of the bolt 39 so that one end abuts against the nut 40 and its other end has trunnions 41a projecting laterally from it. The loop 37 has a hole through it to receive the shank 39a of the connecting bolt 39 with the sleeve 41 on it so that the trunnions 41a projecting from the sleeve 41 can seat in the loop 37. A bracket 42 is fastened to the other end of the tightening band 32 by a rod 42a that seats in the end of the loop 38 on the tightening band 32 and has its ends mounted in open ends 42b of the bracket 42 opposite a closed end 42c of the bracket 42. The closed end 42c of the bracket 42 has an outwardly opening slot 42d in it that will receive the shank 39a of the connecting bolt 39 allowing the transverse rod 39b to seat in and engage the closed end 42c of the bracket 42. Thus when the nut 40 is turned onto the shank 39a of the connecting bolt 39, it forces the sleeve 41 with its trunnions 41a in the loop 37 toward the transverse rod 39b on the end of the bolt 39 and seated in the bracket 42. Since the bracket 42 is attached to the loop 38, the nut 40 draws the looped ends 37 and 38 together, tightening the band 32. Turning the nut 40 the other way, loosens the band 32. As the clamping ring 33 is thus circumferentially tightened about the assembled flanges 20 and 28, the opposed inclined plane operation of the walls 35 and 36 against the outside surfaces 22 and 30 of the flanges 20 and 28 compresses the machined sealing surfaces 21 and 29 tightly together so as to achieve the desired seal and to form the necessary structural mounting of the cover 2 onto the base 1. The clamping band 3 is commercially available but the use of such a band with an electrical housing of this type is believed to be entirely novel.

In the base 1, a transverse mounting plate 43 is screw mounted on the tops of posts 44 that are integrally cast as a part of the base 1 to rise out of recessed conduit ports 45 and 46 in the top and bottom sides of the cylindrical lateral wall 4 of the base portion 1. The transverse mounting plate 43 thus extends across the open front end of the base 1 just inside and parallel to the machined sealing surface 21 on the flange 20. A longitudinal mounting plate 47 is vertically oriented and riveted to the transverse mounting plate 43 to project longitudinally out of the center of the base portion 1 and to divide the hollow interior of the cover portion 2 into two chambers 58 and 59. A pair of ridges 48 and 49 extend longitudinally at the top and bottom of the inside surface of the lateral cylindrical wall of the cover portion 2, and the ridges 48 and 49 protrude into the hollow interior of the cover portion 2 to provide a guide and stabilizing means for the edges of the longitudinal mounting plate 47. The lateral edges of the longitudinal mounting plate 47 are angled away from the vertical in one direction and metal strips are welded to the lateral edges of the longitudinal mounting plate 47 and angled in the opposite direction to form V-shaped channels 50 and 51 at the lateral edges of the longitudinal mounting plate 47 that fit slidably over the respective ridges 48 and 49. The ridges 48 and 49 and the corresponding channels 50 and 51 thus cooperate to serve as guides for the assembly of the longitudinal mounting plate 47 in the cover portion 2 and fastening means between the longitudinal mounting plate 47 and the cover portion 2.

A transformer 52 is mounted on the center of the transverse mounting plate 43 to occupy the inside of the crown of the dished end 5 of the base 1. On one side of the longitudinal mounting plate 47 in the chamber 58, (see FIG. 6) a circuit breaker 53 and an auxiliary relay 54 are mounted next to each other, and a terminal block 55 is mounted to one side of the circuit breaker 53 and the auxiliary relay 54. A pair of windows 56 and 57 are formed in the longitudinal mounting plate 47 on opposite sides of the circuit breaker 53 communicating between the chambers 58 and 59 on opposite sides of the longitudinal mounting plate 47 to accommodate electrical connections between the various components in the enclosure.

On the opposite side of the longitudinal mounting plate 47, that is in the chamber 59, a main contactor 60 and an overload relay 61 are mounted side by side. A pushbutton assembly 62 is mounted in an opposite corner of the longitudinal mounting plate 47 close to the dished end 13 of the cover 2 in the chamber 59 with the main contactor 60.

High voltage from the main line will be carried by conductors inside conduits into the base 1 of the enclosure to be connected to the terminals of the circuit breaker 53. None of the electrical conductors or conduits are shown in the drawings, but those skilled in the art will require no specific disclosure of the wiring and piping to know how to use and install a housing embodying the present invention. The stepdown transformer 52 will also be energized by the line voltage and it will provide a reduced voltage to energize the winding of the main contactor 60 through the pushbutton assembly 62. In many installations, if not in most, the pushbutton assembly 62 will be located in a remote pilot site, but in the embodiment shown, it is mounted inside of the enclosure. The circuit breaker 53 will be located in the main lines in series with the load, and the overload relay 61 is also connected to the load. The ports 10, 11, 45 and 46 are provided in the base portion 1 to accommodate conduits carrying electrical conductors in and out of the enclosure. One feature that fairly characterizes an enclosure embodying the present invention is its highly versatile adaptability to virtually any combination of electrical components that the user may want to enclose in it.

The circuit breaker handle 19 is fastened on the end of a threaded shaft 63 that is rotatably mounted in a threaded hole 68 through the center of the recessed surface 18 of the lateral wall 12 of the cover 2. The screw mounting of the circuit breaker handle shaft 63 in the threaded hole 64 satisfies the Nema specifications for a seal for such an enclosure. Since the circuit breaker handle shaft 63 turns through approximately 60° when the circuit breaker handle 19 is actuated, a short axial movement of the circuit breaker handle shaft 63 must be anticipated and provided for. A crank 65 is fastened to the inside end of the circuit breaker handle 63 so that a roller 66 on its end fits in a slot 67 of a sliding plate 68 of an actuator assembly 69. The actuator assembly 69 has a fixed plate 70 that is screw mounted onto the circuit breaker 63 and has guide pins 71 projecting from it through guide slots 72 in the sliding plate 68. An aperture 73 in the sliding plate 68 receives an actuator 74 of the circuit breaker 53 so that when handle 18 is moved to drive the crank roller 66, the crank roller 66 moves the sliding plate 68 which shifts the actuator 74 of the circuit breaker 53. An extension spring 116 holds the circuit breaker handle 19 in either of its two stable positions, i.e. on and off, and is connected between the end 13 of the cover 2 and the crank roller 66 (see FIG. 7).

On the other side of the enclosure, operator assemblies 75 and 76 are provided for resetting the overload relay 61 and actuating the pushbutton assembly 62, respectively. The operator assembly 75 for the overload relay 61 includes the overload reset handle 16 fastened to the outside end of a threaded shaft 77 that is rotatably mounted in the threaded hole 78 through the flattened surface 15 of the lateral wall 12 of the cover portion 2. Inside the cover portion 2, a torsion bias spring 79 is mounted around the overload reset shaft 77 with one end hooked to an actuator arm 80 projecting from the reset shaft 77 and engaging a reset button 81 on the overload relay 61. The bias spring 79 tends to hold a reset handle 16 on its normal position, and when the reset handle 16 is depressed, the arm 80 depresses the reset button 81, resetting the overload relay 61.

The operator assembly 76 for the pushbutton assembly 62 has the on-off pushbutton handle 17 fastened at its center to an external end of a threaded shaft 82 that is rotatably mounted in the threaded hole 83 through the flattened surface 18 of the lateral wall 12 of the cover 2 adjacent to the overload reset handle 16. Inside of the hollow cover 2, a pushbutton actuator lever 84 is centrally fastened on the end of the pushbutton shaft 82 so that as the pushbutton shaft 82 is oscillated in its mounting hole 83 by moving the handle 17 outside of the cover 2, the ends of the actuator lever 84 depress one or the other pushbutton 85 or 86 inside of the cover 2. As can be seen in FIG. 9, a lead spring 87 has one end screwed to the inside of the dished cover end 13 to project over a bracket 88 on the pushbutton shaft 82 so as to normally bias the pushbutton shaft 82 in its nonactuated position. The threaded mountings of the overload relay shaft 77 in its mounting hole 78 and the pushbutton shaft 82 in its mounting hole 83 provide seals specified by the Nema standards for this type of enclosure.

An alternative operator assembly 89 for the circuit breaker 53 is shown in FIG. 10 and it employs a reciprocable plunger 90 with a handle 91 projecting out of the enclosure. A sliding plate 92 riveted on an inside end of the plunger shaft 93 has an aperture 94 through it to receive an actuator 95 on the circuit breaker 53, which is mounted so that its actuator 95 is operating in a direction 90° of that shown in the previous embodiment. A guide plate 96 is screw mounted to the inside of the lateral wall 12 of the cover 2, and the guide plate 96 has a guide slot 97 through it to receive the sliding plate 92 and guide its linear reciprocating movements. The plunger shaft 93 is slidably mounted through a sealing bushing 98 in a longitudinal hole through the wall of the cover 2.

In FIG. 11 similar alternative embodiments are shown in operator assemblies 99 and 100, respectively, for the overload relay 61 and the pushbutton assembly 62. The operator assembly 99 for the overload relay 61 includes a plunger 101 slidably mounted in a sealing bushing 102 that is mounted in an opening 103 through a recessed portion 104 of the crown of the dished end 13 of the cover portion 2, and the inside end of the plunger 101 bears against the reset button 81 of the overload relay 61. Plungers 105 and 106 of the pushbutton operator assembly 100 have handles 107 and 108 on their exterior ends, respectively, and they are slidably mounted in respective bushings 109, 110 through apertures 111 and 112 in a recessed area 113 in the crown of the dished end 13 of the cover portion 2. The inside ends of the plungers 105 and 106, respectively, are adapted to engage pushbuttons 85 and 86 of the pushbutton assembly 62.

If the circuit breaker 53, for example, is not to be actuated, but is to be set and operated in a single position continuously, provision is made for locking the circuit breaker handle 19 with a padlock 115. A bracket 114 is fastened to the flattened surface 18 by the shaft 64 and the bracket 114 has a hole to receive the padlock 115. The padlock 115 then can be closed, either around the handle 19 or through a hole (not shown) in the handle 19 and through the hole in the bracket 114 and locked. The handle 19 would thus be held in its horizontal position.

The base 1 of the enclosure has its rearward, dished end 5 mounted to a vertical panel (not shown) by bolts, screws, or the like passing through the mounting holes 8 and mounting slots 9 in the plate 7 to which the legs 6 are fastened so that it projects horizontally outwardly from the panel (not shown). After the electrical apparatus has been mounted on the mounting plates 43 and 47 and wired, the cover 2 may be assembled onto the base 1. This assembly is accomplished by sliding the ridges 48 and 49 projecting internally from the inside lateral walls 12 of the cover 2 and to the V-shaped channels 50 and 51, respectively, on the lateral edges of the longitudinal mounting plate 47 and sliding the cover 2 rearwardly toward the base 1 so that the guide pins 24 and 25 projecting from the base 1 register in the guide holes 26 and 27, respectively, in the ends of the ridges 48 and 49. This places the cover 2 in perfect registry with the base 1 so that the sealing surfaces 21 and 29 on the flanges 20 and 28 of the base 1 and cover 2 are perfectly aligned in abutting sealing relationship. When the nut 40 is turned on to the shank 39a of the bolt 39, the clamping band 3 can be easily drawn about the flanges 20 and 28 to seat the crossbar 39b in the bracket 42 to reengage the fastening means of the tightening band 32. Then by turning the nut 40 down the shank 39a of the bolt 39 the crossbars 39b on the bolt 39 and the trunnions 41a on the sleeve 41 are drawn together tightening the tightening band 32 about the clamping channel 33, forcing the diverging walls 35 and 36 of the channel 33 to act as opposing inclined planes driving the sealing surfaces 21 and 29 into tight sealing engagement and also holding the flanges 20 and 28 together so as to mount the cover 2 on the base 1 and form a single enclosure out of them.

Although operating means for the specific arrangement of electrical components illustrated are shown in the drawing, an extensive variety of different types of electrical components and arrangements may be mounted inside of the enclosure. For example any pilot device, such as a selector switch, may be used instead of the pushbutton assembly shown, or an interrupter may be substituted for the circuit breaker, and so on. Appropriate operating means are readily adapted for each electrical component, so that when the cover 2 is mounted on the base 1 in the manner described the internal operators will always align with the actuators on the components. The electrical apparatus mounted inside of the enclosure according to the present invention requires no special adaptation or design for use in this enclosure, and the apparatus may be standard, production line, stock components. When the cover 2 is removed from the base 1, the electrical apparatus mounted on opposite sides of the longitudinal longitudinal mounting plate 47 is presented with all of its terminals and operating mechanisms fully exposed and conveniently located for installation and maintenance work.

The removal and replacement of the cover 2 on the base 1 to open and close the enclosure according to the present invention may be performed quickly and easily, requiring no special tools and no special technique for proper alignment of the two parts. The ridges 48 and 49 in the channels 50 and 51 will hold the cover 2 in position while the ring 3 is being manipulated so that assembly and disassembly can be performed by one man without help. The longitudinal mounting plate 47 thus serves to support the cover 2 during assembly, but it also guides the cover 2 during assembly and disassembly so that the cover 2 does not touch the electrical components or wiring. The guide pins 24 and 25 ensure that the sealing surfaces 21 and 29 and the flanges 20 and 28 are in proper alignment. The proper mounting of the clamping band 3 about the flanges 28 and 20 will also be self-evident to the repair man, and it too can only be assembled in the proper manner. Hence, the proper assembly and disassembly of an enclosure made according to the present invention can be accomplished perfectly each time without practice or training.

The structure of the present invention is such as may be adapted to provide a number of additional advantageous features. An enclosure embodying the present invention readily lends itself to an arrangement such that complete, prewired motor starters can be installed or replaced without dismantling them. By using different size top and bottom guide pins 24 and 25, for example, correct assembly of the cover 2 on the base 1 can be assured. Also, the cover 2 can easily be interlocked with the circuit breaker 53 so that the circuit breaker 53 must be opened before the cover 2 can be removed.

Manifestly, the invention is not limited to the specific embodiment disclosed here as the best method presently contemplated by the inventors for carrying out their invention. To exploit the full potential and versatility of the present invention a wide variety of configurations and modifications will of necessity be employed. Therefore, the invention is not limited to what has been shown and described here but rather is defined by the claims that follow.

I claim:

1. An enclosure with electrical power control apparatus for hazardous locations comprising the combination of:
   an outwardly opening hollow base portion with a closed inner end adapted for mounting on a panel, having an annular flange about its outer end presenting an integrally formed rigid outwardly facing sealing surface;
   an inwardly opening hollow cover portion with a closed outer end having an annular flange about its inner end presenting an integrally formed rigid inwardly facing sealing surface abutting said outwardly facing sealing surface of said annular flange on said base portion;
   said cover portion and said base portion being assembled together with said outwardly facing sealing surface of said base portion in immediate abutting engagement with said outwardly facing sealing surface of said cover portion to form a seal to isolate from ambient atmosphere an enclosed hollow interior formed by said assembly of said cover portion and said base portion;
   a clamping ring surrounding said annular flanges and having diverging interior surfaces bearing against said flanges and urging said sealing surfaces into mating sealing relationship; and
   electrical apparatus mounted within the assembled base and cover portions.

2. An enclosure with electrical power control apparatus as set forth in claim 1, wherein said closed inner end of said base portion is dished; and said closed outer end of said cover portion is dished.

3. An enclosure with electrical power control apparatus as set forth in claim 1, wherein conduit ports are formed in said base portion to receive conduits and electrical conductors passing in and out of said assembled base and cover portions.

4. An enclosure with electrical power control apparatus as set forth in claim 1, wherein an operator assembly is mounted in said cover portion and having an operator handle mounted exteriorly of said cover portion adapted to control means inside said hollow cover portion to operate said electrical apparatus enclosed within said assembled base and cover portions.

5. An enclosure with electrical power control apparatus as set forth in claim 4 wherein said operator assembly includes an operator handle fastened on an outside end of a shaft rotatably threadedly mounted through a wall of said cover portion to form a seal between the outside and the inside of said hollow cover portion and an operator fastened on an inside end of said threaded rotatable shaft to engage an actuator on electrical apparatus inside said cover.

6. An enclosure with electrical apparatus comprising the combination of:
   a base portion having a hollow interior, a cylindrical sidewall, a closed base end adapted for mounting on a panel, and having a front facing opening;
   a cover portion having a hollow interior, a cylindrical lateral wall with a pair of longitudinal ridges protruding inwardly from opposite sides of said cylindrical lateral wall, and having an opening facing said opening of said base portion;
   said base portion and said cover portion being assembled with said opening on said cover portion abutting said front-facing opening on said base portion to form a completely enclosed hollow interior sealed from an ambient external atmosphere;
   clamping means securing said assembled cover portion and base portion together;
   a transverse mounting plate anchored in said base portion across said opening;
   a longitudinal mounting plate fastened to said transverse mounting plate projecting from said transverse mounting plate out of said opening dividing said hollow interior of said cover portion into two chambers, and having a channel on each lateral edge slidingly engaging said longitudinal ridges protruding inwardly from opposite sides of said lateral sidewall of said cover portion;
   electrical apparatus within said assembled base and cover portions and carried by said plates; and
   external manual controls on said cover portion with means communicating through a seal to operate said electrical apparatus.

7. An enclosure with electrical apparatus comprising the combination of:
   a forwardly opening base portion having a shallow cylindrical sidewall relative to its circumferential length, a closed rearward end with means for mounting the enclosure on a panel, conduit ports providing access to said enclosure for electrical conductors, and an annular flange formed on a forward edge of said cylindrical sidewall with a forwardly facing sealing surface;
   a rearwardly opening cover portion having a broad cylindrical sidewall, a closed forward end, external manually operable controls communicating through seals with the interior of said cover portion, and having an annular flange formed on a rearwardly edge of said cylindrical sidewall with a rearwardly facing sealing surface shaped to mate with said forwardly facing sealing surface on said flange on said base portion;
   said cover portion being assembled on said base portion and supported by said base portion with said rearwardly facing sealing surface of said cover portion in abutting engagement with said forwardly facing sealing surface of said base portion to form a completely enclosed hollow interior;
   an annular clamping ring fitted outside said annular flanges, having tightening means tightening said annular clamping ring circumferentially about said annular flanges, and having a channel-shaped cross section with diverging interior surfaces engaging said annular flanges and forcing said mating sealing surfaces together; and
   electrical apparatus mounted within said assembled base and cover portions that is in operative relation to said controls.

8. An enclosure with electrical apparatus comprising the combination of:
   a base having an outwardly opening hollow cylindrical shape with a closed dished inner end adapted for mounting on a panel, recessed conduit ports through its lateral cylindrical wall, legs projecting from said base substantially parallel to said lateral cylindrical wall whereby said base may be mounted to a panel with sufficient clearance for said dished end, and an annular flange formed on the outward end of its cylindrical walls presenting an outwardly facing machined, rigid sealing surface;
   a cover having an inwardly opening hollow cylindrical shape with a closed dished outer end, a manual control adjacent said outer end communicating through a seal with the hollow interior and recessed so as to be substantially within a profile of said cover, and an annular flange formed on the inward end of the cylindrical wall with an inwardly facing machined, rigid sealing surface abutting in sealing relationship said outwardly facing machined, rigid sealing surface of said flange on said base;
   an annular clamping ring fitted around said abutting flanges having tightening means and a channel-shaped cross section with diverging side surfaces engaging said flanges and formed as opposed inclined planes forcing such machined sealing surfaces of said flanges together; and
   electrical apparatus mounted within said base and cover.